United States Patent [19]

Morgan et al.

[11] 4,094,850
[45] June 13, 1978

[54] FLAME RETARDANT COMPOSITION

[75] Inventors: Albert W. Morgan, Collinsville, Ill.;
David S. Moorman, Houston, Tex.;
William Vanderlinde, St. Louis, Mo.

[73] Assignee: Monsanto Company, St. Louis, Mo.

[21] Appl. No.: 702,802

[22] Filed: Jul. 6, 1976

Related U.S. Application Data

[63] Continuation-in-part of Ser. No. 619,722, Oct. 6, 1975, abandoned, which is a continuation of Ser. No. 232,189, Mar. 6, 1972, abandoned.

[51] Int. Cl.² .......................... C08K 5/11; C08K 5/12
[52] U.S. Cl. .................. 260/31.8 PQ; 260/31.2 R; 260/31.2 MR; 260/31.8 HA; 260/31.8 B; 260/31.8 M; 260/31.8 DR
[58] Field of Search .............. 260/31.2 R, 31.2 MR, 260/31.8 B, 31.8 PQ, 31.8 HA, 45.85 T, 45.85 V, 889, 897 B, DIG. 24

[56] References Cited

U.S. PATENT DOCUMENTS

| | | | |
|---|---|---|---|
| 2,302,743 | 11/1942 | Carruthers | 260/31.8 HA |
| 2,525,961 | 10/1950 | Shugar | 260/31.8 HA |
| 3,046,237 | 7/1962 | Rosenfelder | 260/897 C |
| 3,085,097 | 4/1963 | Strobel | 260/45.85 V |
| 3,634,320 | 1/1972 | Metzner | 260/45.85 R |

*Primary Examiner*—Paul R. Michl

*Attorney, Agent, or Firm*—George R. Beck; Robert E. Wexler; Edward P. Grattan

[57] ABSTRACT

A composition consisting essentially of an olefin polymer and a plasticizer therefor of the formula

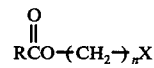

wherein
R represents alkyl, aryl,

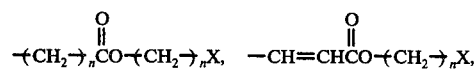

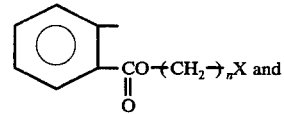

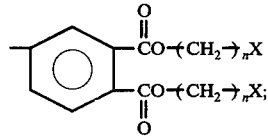

X represents halogen; and
n represents the integers 4 or 5.

The composition is useful in plastic molding and forming processes to make articles of manufacture.

36 Claims, No Drawings

FLAME RETARDANT COMPOSITION

This application is a continuation-in-part of copending application Ser. No. 619,722, filed Oct. 6, 1975, now abandoned, which is a continuation of Ser. No. 232,189, filed Mar. 6, 1972, now abandoned.

BACKGROUND OF THE INVENTION

This invention relates to plasticized polyolefin compositions and, more particularly to plasticized, flame retardant olefin polymer compositions. Specifically, the invention is directed to a composition consisting essentially of an olefin polymer containing, as a preferred embodiment, a compatible plasticizer and antimony oxide.

It is well known that conventional plasticizers are normally incompatible with olefin polymers. Thus, attempts to incorporate conventional plasticizers result in a product wherein the plasticizer "blooms", i.e., separates and migrates to the surface, to such an extent that the product is unusable.

Although the use of plasticizers with olefin polymers would increase the olefin polymer characteristics, such as flexibility, and would improve low temperature properties and decrease processing temperatures, olefin polymers are not ordinarily plasticized at the present time in view of the problem discussed above.

Similarly, flame retardance has been difficult to build into olefin polymers since almost all additives appear to suffer from incompatibility with olefin polymers.

U.S. Pat. No. 2,525,961 provides certain chlorobutyl and chlorobutoxybutyl esters of phthalic acid as plasticizers for cellulose derivatives, vinyl chloride polymers and alkyd resins. The compounds disclosed, however, are not taught to be compatible with resins other than the named resins and there is no indication that similar esters could be used as compatible plasticizers for olefin polymers.

Accordingly, the main objective of the present invention is to provide compatible plasticizers for olefin polymers.

SUMMARY OF THE INVENTION

It has been unexpectedly discovered that certain halogenated organic acid esters are highly compatible with olefin polymers and may be incorporated therein as plasticizers. It has further been found that such halogenated acid esters increase the flame retardance of olefin polymers containing antimony trioxide.

DESCRIPTION OF THE PREFERRED EMBODIMENT

In accordance with the present invention, it has been found that esters of organic acids of the general formula:

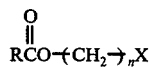

wherein
R represents alkyl, aryl,

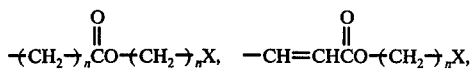

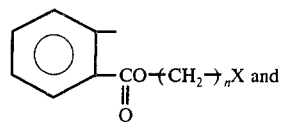

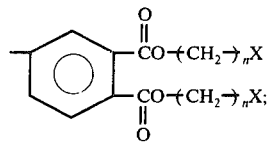

X represents halogen; and
$n$ represents the integers 4 or 5
are highly compatible plasticizers for olefin polymers.

The esters of the above formula are easily prepared by reacting the appropriate acid halide with a five or six membered cyclic ether.

Typical acid halides which are utilized in accordance with the present invention are the halides of aliphatic and aromatic acids, including saturated aliphatic monocarboxylic acids of from 2 to 18 carbon atoms, e.g., acetic, pentanoic, capric, lauric and stearic acids; saturated aliphatic dicarboxylic acids of from 4 to 10 carbon atoms, e.g., succinic, adipic and sebacic acids; unsaturated aliphatic dicarboxylic acids of 4 to 10 carbon atoms such as fumaric and maleic acid; aromatic dicarboxylic acids, e.g. phthalic acid and aromatic tricarboxylic acids, e.g., trimellitic acid.

It is understood that, as used herein, the terms "alkyl", "aliphatic", "aryl" and "aromatic" also include substituted structures such as alkyl, aryl and polar group substitution.

Illustrative cyclic ethers which are used in accordance with this invention include tetrahydrofuran, tetrahydro-2-methylfuran and tetrahydropyran.

Illustrative esters, which are utilized as flame retardant plasticizers in accordance with this invention, include bis(4-chlorobutyl) phthalate,
4-chlorobutylbenzyl tetrachlorophthalate,
bis(4-chlorobutyl) adipate,
bis(4-chlorobutyl) tetrachlorophthalate,
bis(4-bromobutyl) adipate,
bis(4-bromobutyl) phthalate,
tris(4-bromobutyl) trimellitate,
bis(4-chlorobutyl) maleate,
4-chlorobutyl acetate,
4-bromobutyl stearate,
bis(5-chloropentyl) phthalate, and
5-bromopentyl butyrate.

The olefin polymers which are plasticized in accordance with this invention include polymonoolefins such as polyethylene, polypropylene, polybutylene, e.g. poly-n-butylene and polyisobutylene; polydiolefins such as polybutadiene, polyisoprene and polychloroprene; interpolymers of at least one monoolefin and a diolefin, e.g., ethylene/butadiene, propylene/iosprene, isobutylene/butadiene, ethylene/propylene/butadiene; interpolymers of at least one monoolefin and a comonomer selected from the group consisting of acrylonitrile, vinyl acetate and another monoolefin, e.g., ethylene/styrene, ethylene/acrylonitrile, ethylene/vinyl acetate, ethylene/propylene, ethylene/isobutylene; and polyblends of monoolefins with vinyl acetate and diolefins, e.g. polyethylene/polyvinyl acetate, ethylene/propylene interpolymer polyblended with polybutadiene.

The plasticizers of the present invention are incorporated in the olefin polymers by conventional milling or extrusion methods.

The plasticizers are generally added in plasticizing amounts of from about 1 to at least about 50 parts per hundred parts resin (i.e., phr) or more, but preferably are added in amounts of from about 5 to about 20 phr.

In addition to the plasticizers of the present invention, the olefin polymer compositions may contain other processing ingredients such as fillers, extenders, colorants, stabilizers and similar conventional processing additives.

The following non-limiting examples serve to illustrate certain specific embodiments of the present invention.

EXAMPLE 1

The following resin formulations are prepared:

| Ingredient | Parts by Weight | | | | | |
|---|---|---|---|---|---|---|
| | 1 | 2 | 3 | 4 | 5 | 6 |
| Polyethylene | 40 | 40 | 40 | 40 | — | — |
| Polypropylene | — | — | — | — | 20 | 20 |
| Bis(4-chlorobutyl adipate) | 20 | — | — | 10 | 20 | — |
| Bis(4-chlorobutyl phthalate) | — | 20 | 10 | — | — | 20 |
| SANTOWHITE Powder[1] | 1 | 1 | 1 | 1 | 1 | 1 |

[1] 4, 4'-butylidenebis(6-tert-butyl-m-cresol)

In all formulations, the adipate and phthalate plasticizers are compatible when added on a 2-roll mill as the polyethylene or polypropylene sheet is being worked. The material is slightly flexible.

EXAMPLE 2

A paste is prepared from 50 grams 4-chlorobutylbenzyl tetrachlorophthalate and 0.25 gram carbon black.

A polyethylene sheet is formed and 10 phr of the paste is milled into the resin at 150° C.

Similar results may be obtained by substituting ethylene/propylene, ethylene/vinyl acetate, ethylene/acrylonitrile, polyisobutylene, polybutadiene, polyisoprene, polychloroprene, poly-n-butylene, ethylene/butadiene, isobutylene/butadiene or ethylene/styrene polymers for the polyethylene of this example.

EXAMPLE 3

The following samples are prepared:

| Ingredient | Parts by Weight | |
|---|---|---|
| | Sample 1 | Sample 2 |
| Polyethylene | 32 | 27.5 |
| SANTOWHITE Powder[1] | 0.5 | 0.75 |
| Carbon Black | 2 | 2 |
| Paste[2] | 8 | 12 |

[1] 4, 4'-butylidenebis(6-tert-butyl-m-cresol)
[2] Paste = 50 parts 4-chlorobutylbenzyl tetrachlorophthalate and 0.25 part carbon black The paste is compatible in both samples.

Similar results may be obtained by substituting polypropylene, ethylene/acrylonitrile, ethylene/vinyl acetate, ethylene/isobutylene polymers, polyethylene/polyvinylacetate and ethylene/propylene/polybutadiene for the polyethylene of this example.

EXAMPLE 4

The following samples are prepared:

| Ingredients | Parts by Weight | | | | | | | |
|---|---|---|---|---|---|---|---|---|
| | 1 | 2 | 3 | 4 | 5 | 6 | 7 | 8 |
| Polypropylene | 100 | 100 | 100 | 100 | 100 | 100 | 100 | 100 |
| Antimony trioxide | — | 5 | 5 | 5 | 5 | 5 | 5 | 5 |
| Carbon black | — | 3 | 3 | 3 | 3 | 3 | 3 | 3 |
| Bis(4-chlorobutyl)tetrachlorophthalate | — | — | — | — | — | 10 | — | — |
| Bis(4-bromobutyl)adipate | — | — | — | 10 | — | — | — | — |
| Bis(4-chlorobutyl)adipate | — | — | — | — | 10 | — | — | — |
| Bis(4-bromobutyl)phthalate | — | — | — | — | — | — | 10 | — |
| Tris(4-bromobutyl)trimellitate | — | — | — | — | — | — | — | 10 |
| 4-Chlorobutylbenzyl tetrachlorophthalate | — | — | — | — | — | — | — | — |
| Bis(4-chlorobutyl)phthalate | — | — | 10 | — | — | — | — | — |
| Oxygen Index | 18.1 | 18.8 | 19.1 | 19.9 | 19.1 | 19.6 | 19.9 | 19.6 |
| Increase over differential of Samples 1 and 2 | — | — | 0.3 | 1.1 | 0.3 | 0.8 | 1.1 | 0.8 |

| Ingredients | Parts by Weight | | | | | | | |
|---|---|---|---|---|---|---|---|---|
| | 9 | 10 | 11 | 12 | 13 | 14 | 15 | 16 |
| Polypropylene | 100 | 100 | 100 | 100 | 100 | 100 | 100 | 100 |
| Antimony trioxide | 5 | 5 | 5 | 5 | 5 | 5 | 5 | 5 |
| Carbon black | 3 | 3 | 3 | 3 | 3 | 3 | 3 | 3 |
| Bis(4-chlorobutyl)tetrachlorophthalate | — | 20 | — | — | — | — | — | — |
| Bis(4-bromobutyl)adipate | — | — | 20 | — | — | — | — | — |
| Bis(4-chlorobutyl)adipate | — | — | — | 20 | — | — | — | — |
| Bis(4-bromobutyl)phthalate | — | — | — | — | — | 20 | — | — |
| Tris(4-bromobutyl)trimellitate | — | — | — | — | — | — | 20 | — |
| 4-Chlorobutylbenzyl tetrachlorophthalate | 10 | — | — | — | — | — | — | 20 |
| Bis(4-chlorobutyl)phthalate | — | — | — | — | 20 | — | — | — |
| Oxygen Index | 19.6 | 19.6 | 20.6 | 19.4 | 19.6 | 20.6 | 20.9 | 19.6 |
| Increase over differential of Samples 1 and 2 | 0.8 | 0.8 | 1.8 | 0.6 | 0.8 | 1.8 | 2.1 | 0.8 |

The samples are milled at 177° C. for five minutes and molded at 150° C. for five minutes. All of the plasticizers are compatible with the polypropylene and complement the flame retardant characteristics imparted by antimony trioxide.

Oxygen index data is obtained by subjecting the samples to ASTM D2863-70 which is used to determine the relative flammability of plastics by measuring the minimum concentration of oxygen in a slowly rising mixture of $O_2/N_2$ that will just support combustion. The "oxygen index" is defined as the minimum concentration of oxygen, expressed as volume percent, in a mixture of $O_2/N_2$ that will just support combustion of the plastic material.

Similar results may be obtained if ethylene/propylene, ethylene/vinyl acetate, ethylene/propylene/butadiene interpolymer or ethylene/butadiene polymers are substituted for the polypropylene of this example.

EXAMPLE 5

The following samples are prepared:

| Ingredients | Parts by Weight | | | | | | | | | |
|---|---|---|---|---|---|---|---|---|---|---|
| | 1 | 2 | 3 | 4 | 5 | 6 | 7 | 8 | 9 | 10 |
| Polypropylene | 100 | 100 | 100 | 100 | 100 | 100 | 100 | 100 | 100 | 100 |
| Antimony trioxide | — | 5 | 5 | 5 | 5 | 5 | 10 | 10 | 10 | 10 |
| Carbon black | — | 3 | 3 | 3 | 3 | 3 | 6 | 6 | 6 | 6 |
| Bis(4-bromobutyl) adipate | — | — | 30 | — | — | — | 40 | — | — | — |
| Tris(4-bromobutyl) trimellitate | — | — | — | 30 | — | — | — | 40 | — | — |
| 4-Chlorobutylbenzyl tetrachlorophthalate | — | — | — | — | 30 | — | — | — | 40 | — |
| Bis(4-chlorobutyl) tetrachlorophthalate | — | — | — | — | — | 30 | — | — | — | 40 |
| Oxygen Index | 18.1 | 18.8 | —[1] | —[1] | 19.4 | 19.7 | 21.8 | 22 | 20.8 | 20.8 |
| Increase over differential of Samples 1 and 2 | — | — | — | — | 0.6 | 0.9 | 3.0 | 3.2 | 2.0 | 2.0 |

[1]Samples not tested

The samples are milled at 177° C. and molded at 150° C. for five minutes. All of the plasticizers are compatible and those samples tested for oxygen indices show that the plasticizers also complement the flame retardant characteristics of antimony trioxide and thus impart a degree of flame retardance to the polymer.

EXAMPLE 6

The following samples are prepared:

| Ingredients | Parts by Weight | | | | | |
|---|---|---|---|---|---|---|
| | 1 | 2 | 3 | 4 | 5 | 6 |
| Polypropylene | 100 | 100 | 100 | 100 | 100 | 100 |
| Antimony trioxide | — | 5 | 5 | 10 | 7 | 5 |
| Carbon black | — | 3 | 3 | — | 4 | 3 |
| Polyvinyl chloride | — | — | 10 | 20 | 7 | 3 |
| Ba/Cd Stabilizer | — | — | — | 1 | 0.25 | 0.5 |
| Tris(4-bromobutyl) trimellitate | — | — | 40 | 40 | 10 | — |
| 4-Chlorobutylbenzyl tetrachlorophthalate | — | — | — | — | — | 15 |
| Oxygen index | 18.1 | 18.8 | 24.5 | 27.5 | 20.5 | 19.7 |
| Increase over differential of Samples 1 and 2 | — | — | 5.7 | 8.7 | 1.7 | 0.9 |

The samples are milled and molded as in Example 5 and subjected to oxygen index tests.

Samples 3 through 6 illustrate a preferred total plasticizer/flame retardant system for polyolefins. The samples contain a small amount of Ba/Cd stabilizer and a small amount of polyvinyl chloride resin which has been added to increase the chlorine concentration in the polypropylene. The plasticizers are compatible, and the oxygen index data for Samples 4 and 5 are outstanding.

Similar results may be obtained by substituting polyisobutylene or polyethylene polymers for the polypropylene of this example.

While the invention has been described hereinabove with regard to certain illustrative specific embodiments, it is not so limited since many modifications and variations are possible in light of the above teachings. It is understood therefore that the invention may be practiced otherwise than as specifically described without departing from the spirit and scope of the invention.

The embodiments of the present invention in which an exclusive property or privilege is claimed are defined as follows:

1. A composition consisting essentially of a polyolefin, said polyolefin having incorporated the resin a plasticizing amount of a compound of the formula

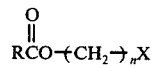

wherein
R represents alkyl,

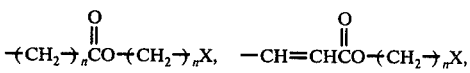

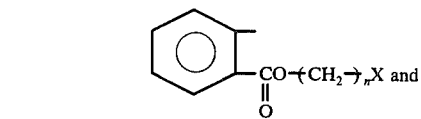

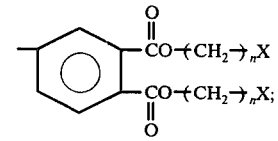

X represents halogen; and
n represents the integer 4 or 5.

2. Composition of claim 1 wherein said polyolefin is a polymonoolefin.

3. Composition of claim 2 wherein said polymonoolefin is selected from the group consisting of polyethylene, polypropylene and polybutylene.

4. Composition of claim 1 wherein said polyolefin is a polydiolefin.

5. Composition of claim 4 wherein said polydiolefin is selected from the group consisting of polybutadiene, polyisoprene and polychloroprene.

6. Composition of claim 1 wherein said compound is bis(4-chlorobutyl) phthalate.

7. Composition of claim 1 wherein said compound is 4-chlorobutylbenzyl tetrachlorophthalate.

8. Composition of claim 1 wherein said compound is bis(4-chlorobutyl) adipate.

9. Composition of claim 1 wherein said compound is bis(4-chlorobutyl) tetrachlorophthalate.

10. Composition of claim 1 wherein said compound is bis(4-bromobutyl) adipate.

11. Composition of claim 1 wherein said compound is bis(4-bromobutyl) phthalate.

12. Composition of claim 1 wherein said compound is tris(4-bromobutyl) trimellitate.

13. Composition of claim 1 wherein said compound is bis(4-chlorobutyl) maleate.

14. Composition of claim 1 wherein said compound is 4-chlorobutyl acetate.

15. Composition of claim 1 wherein said compound is 4-bromobutyl stearate.

16. Composition of claim 1 wherein said compound is bis(5-chloropentyl) phthalate.

17. Composition of claim 1 wherein said compound is 5-bromopentyl butyrate.

18. A composition consisting essentially of an interpolymer of at least one monoolefin and a diolefin and a plasticizing amount of a compound of the formula

wherein
R represents alkyl,

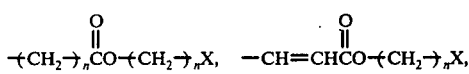

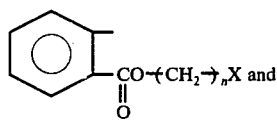

X represents halogen; and
n represents the integer 4 or 5.

19. Composition of claim 18 wherein said interpolymer is ethylene/propylene/butadiene.

20. Composition of claim 18 wherein said compound is bis(4chlorobutyl) phthalate.

21. Composition of claim 18 wherein said compound is 4-chlorobutylbenzyl tetrachlorophthalate.

22. Composition of claim 18 wherein said compound is bis(4-chlorobutyl) adipate.

23. Composition of claim 18 wherein said compound is bis(4-chlorobutyl) tetrachlorophthalate.

24. Composition of claim 18 wherein said compound is bis(4-bromobutyl) adipate.

25. Composition of claim 18 wherein said compound is bis(4-bromobutyl) phthalate.

26. Composition of claim 18 wherein said compound is tris(4-bromobutyl) trimellitate.

27. Composition of claim 18 wherein said compound is bis(4-chlorobutyl) maleate.

28. Composition of claim 18 wherein said compound is 4-chlorobutyl acetate.

29. Composition of claim 18 wherein said compound is 4-bromobutyl stearate.

30. Composition of claim 18 wherein said compound is bis(5-chloropentyl) phthalate.

31. Composition of claim 18 wherein said compound is 5-bromopentyl butyrate.

32. A composition consisting essentially of a polyblend of polyethylene and polyvinylacetate and a plasticizing amount of a compound of the formula

wherein
R represents alkyl, aryl,

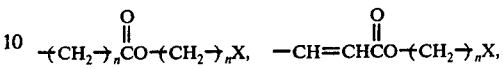

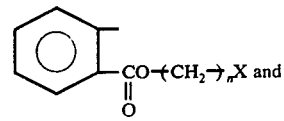

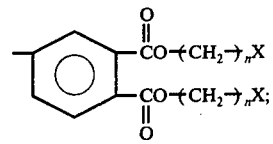

X represents halogen; and
n represents the integer 4 or 5.

33. A composition consisting essentially of (1) a polyblend of an interpolymer of ethylene and propylene and a polydiolefin and (2) a plasticizing amount of a compound of the formula

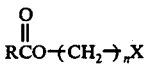

wherein
R represents alkyl, aryl,

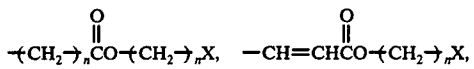

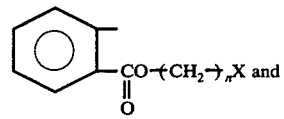

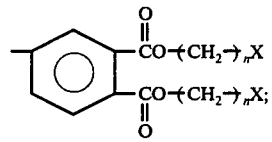

X represents halogen; and
n represents the integer 4 or 5.

34. Composition of claim 33 wherein said polydiolefin is polybutadiene.

35. A composition consisting essentially of an interpolymer of at least one mono-olefin and acrylonitrile and a plasticizing amount of a compound of the formula

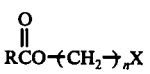

wherein
R represents alkyl, aryl,

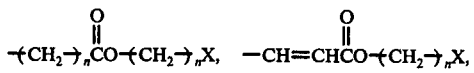

-continued
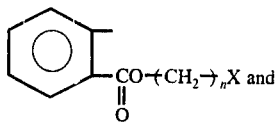
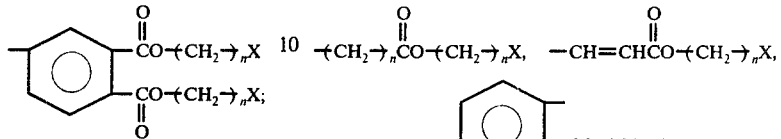
X represents halogen; and
n represents the integer 4 or 5.
36. A composition consisting essentially of an interpolymer of propylene and at least one other mono-olefin, said interpolymer having incorporated therein and a plasticizing amount of a compound of the formula
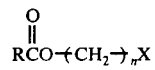
wherein
R represents alkyl, aryl,
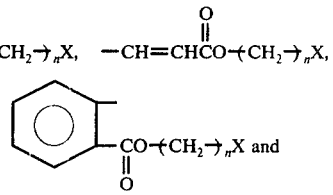
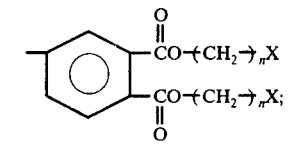
X represents halogen; and
n represents the integer 4 or 5.
* * * * *

UNITED STATES PATENT AND TRADEMARK OFFICE
CERTIFICATE OF CORRECTION

PATENT NO. : 4,094,850

DATED : June 13, 1978

INVENTOR(S) : Albert W. Morgan, David S. Moorman, William Vanderlinde

It is certified that error appears in the above-identified patent and that said Letters Patent are hereby corrected as shown below:

Column 2, line 61, "propylene/iosprene" should be corrected to read -- propylene/isoprene --.

Column 6, line 5, "the resin" should be deleted and corrected to read -- therein --.

Column 7, line 42, "bis(4chlorobutyl)" should be corrected to read -- bis(4-chlorobutyl) --.

Column 9, line 22, after "therein" there should be deleted "and".

Signed and Sealed this

Nineteenth Day of December 1978

[SEAL]

Attest:

RUTH C. MASON
Attesting Officer

DONALD W. BANNER
Commissioner of Patents and Trademarks